United States Patent
Preston et al.

(10) Patent No.: US 6,629,033 B2
(45) Date of Patent: Sep. 30, 2003

(54) OPEN COMMUNICATION SYSTEM FOR REAL-TIME MULTIPROCESSOR APPLICATIONS

(75) Inventors: Dan Alan Preston, Bainbridge Island, WA (US); Robert Pierce Lutter, Tacoma, WA (US)

(73) Assignee: Medius, Inc., Seattle, WA (US)

( * ) Notice: Subject to any disclaimer, the term of this patent is extended or adjusted under 35 U.S.C. 154(b) by 0 days.

(21) Appl. No.: 09/841,753

(22) Filed: Apr. 24, 2001

(65) Prior Publication Data

US 2002/0156564 A1 Oct. 24, 2002

(51) Int. Cl.[7] ................................................. G06F 7/00
(52) U.S. Cl. ............................ 701/70; 701/33; 701/36; 307/9.1
(58) Field of Search ............................. 701/70, 33, 36, 701/45, 41; 340/425.5; 307/9.1, 10.1, 10.2; 709/400

(56) References Cited

U.S. PATENT DOCUMENTS

| 6,161,071 A | * 12/2000 | Shuman et al. ............... 701/48 |
| 6,243,450 B1 | 6/2001 | Jansen et al. |

FOREIGN PATENT DOCUMENTS

| WO | WO96/24229 | 8/1996 |
| WO | WO99/08436 | 2/1999 |
| WO | WO99/57662 | 11/1999 |
| WO | WO99/65183 | 12/1999 |
| WO | WO01/30061 | 4/2001 |
| WO | WO01/58110 | 8/2001 |

OTHER PUBLICATIONS

Product description of Raytheon RT Secure, "Embedded Hard Real–Time Secure Operating System", Copyright 2000, pp. 1–2.
Product description of Raytheon RT Secure, Copyright 2001, pp. 1–2.
Product description of Raytheon RT Secure, "Development Environment", Copyright 2001, pp. 1–2.
Product description of Raytheon Electronic Systems (ES), Copyright 2002, pp. 1–2.
H. Chung, L. Ojeda, and J. Borenstein, "Sensor Fusion for Mobile Robot Dead–reckoning with a Precision–calibrated Fiber Optic Gyroscope", 2001 IEEE International Conference on Robotics and Automation, Seoul, Korea, May 21–26, pp. 1–6.
A. Das, R. Fierro, V. Kumar, J. Ostrowski, J. Spletzer, and C. Taylor, "A Framework for Vision Based Formation Control", IEEE Transactions on Robotics and Automation, vol. XX, No. Y, 2001, pp. 1–13.
J. Takezaki, N. Ueki, T. Minowa, H. Kondoh, "Support System for Safe Driving—A Step Toward ITS Autonomous Driving–", Hitachi Review, vol. 49, No. 3, 2000, pp. 1–8.

(List continued on next page.)

Primary Examiner—Yonel Beaulieu
(74) Attorney, Agent, or Firm—Marger Johnson & McCollom, PC

(57) ABSTRACT

A communication system for a mobile vehicle, home, or office environment includes multiple processors. The multiple processors each run an Open Communication system that controls how data is transferred between processors based on data content as opposed to the links that connect the processors together. The open communication system enables data or messages to be effectively transferred and processed for real-time applications or other server based applications that may be running on the multiple processors in a secure environment regardless of processors, locations, or data links.

30 Claims, 9 Drawing Sheets

OTHER PUBLICATIONS

S.G. Goodridge, "Multimedia Sensor Fusion for Intelligent Camera Control and Human–Computer Interaction", Dissertation submitted to the Graduate Faculty of North Carolina State University in partial fulfillment of the requirements for the degree of Doctor of Philosophy in Electrical Engineering, Raleigh, NC, 1997, pp. 1–5.

M. Chantler, G. Russel, and R. Dunbar, "Probabilistic Sensor Fusion for Reliable Workspace Sensing", pp. 1–14.

ISIS Project: Sensor Fusion, Linkoping University Division of Automatic Control and Communication Systems in cooperation with SAAB (Dynamics and Aircraft), 18 pp.

Hitachi Automated Highway System (AHS), Automotive Products, Hitachi, Ltd., Copyright 1994–2002, 8 pages.

Vehicle Dynamics Lab, University of California, Berkeley, funded by BMW, current members: D. Caveney and B. Feldman,"Adaptive Cruise Control", 17 pages.

Counterair: The Cutting Edge, Ch. 2 "The Evolutionary Trajectory The Fighter Pilot–Here to Stay?" AF2025 v3c8–2, Dec. 1996, pp. 1–7.

Counterair: The Cutting Edge, Ch. 4 "The Virtual Trajectory Air Superiority without an "Air" Force?" AF2025 v3c8–4, Dec. 1996, pp. 1–12.

TNO FEL Annual Review 1998: Quality works, 16 pages.

Boeing News Release, "Boeing Demonstrates JSF Avionics Multi–Sensor Fusion", Seattle, WA, May 9, 2000, pp. 1–2.

Boeing Statement, "Chairman and CEO Phil Condit on the JSF Decision", Washington, D.C., Oct. 26, 2001, pp. 1–2.

Ada 95 Transition Support—Lessons Learned, Sections 3, 4, and 5, CACI, Inc. –Federal, Nov. 15, 1996, 14 pages.

Joint Strike Fighter Terrain Database, ets–news.com "Simulator Solutions" 2002, 3 pages.

MSRC Redacted Proposal, 3.0 Architecture Development, pages 1–43.

Powerpoint Presentation by Robert Allen—Boeing Phantom Works entitled "Real–Time Embedded Avionics System Security and COTS Operating Systems", Open Group Real–Time Forum, Jul. 18, 2001, 16 pages.

Green Hills Software, Inc., "The AdaMULTI 2000 Integrated Development Environment", Copyright 2002, 7 pages.

Luttge, Karsten; "E–Charging API: Outsource Charging to a Payment Service Provider" IEEE; 2001 (pp. 216–222).

* cited by examiner

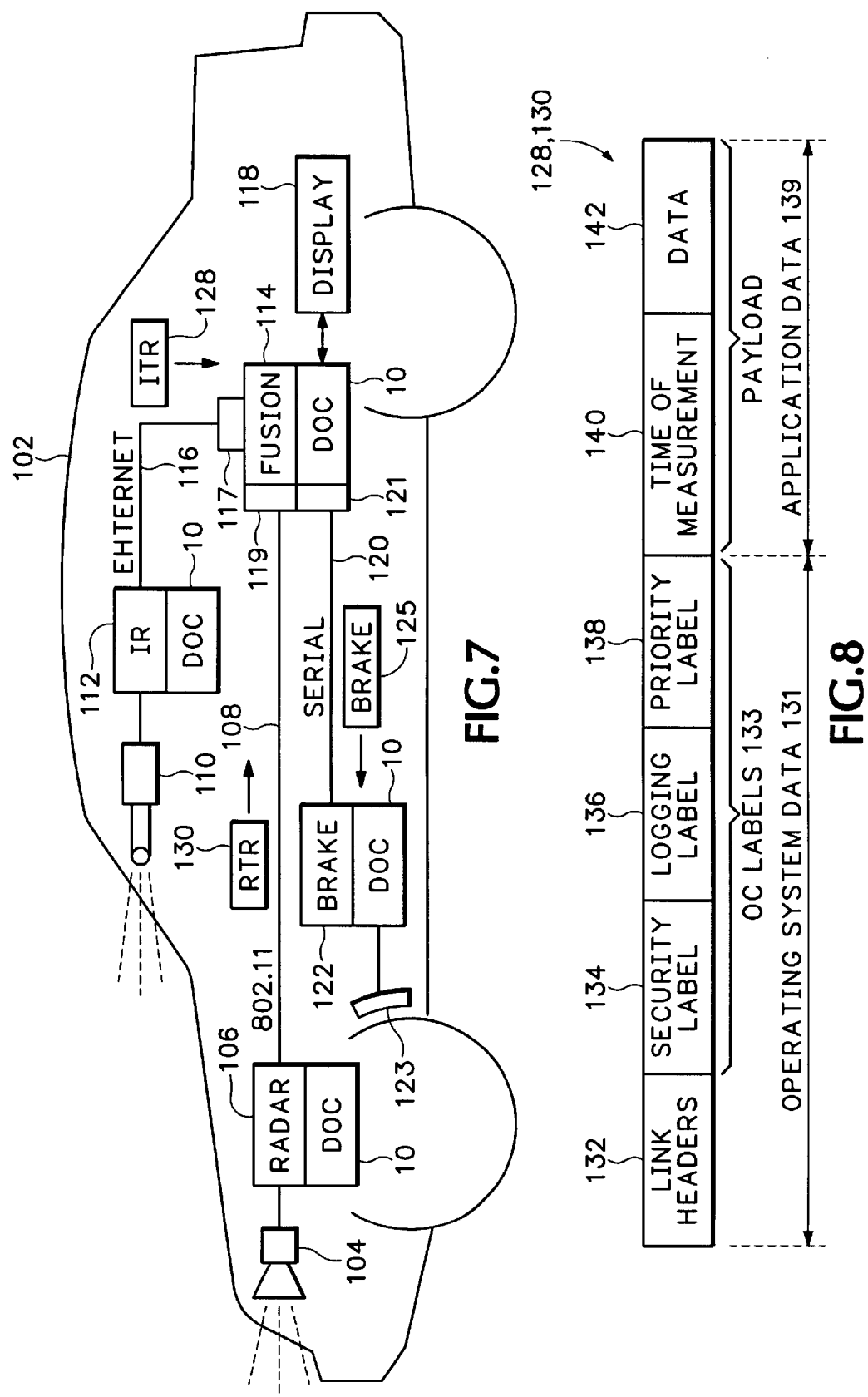

OPEN COMMUNICATION SYSTEM FOR REAL-TIME MULTIPROCESSOR APPLICATIONS

BACKGROUND

Cars include many different electro-mechanical and electronic systems. Examples include braking systems, electronic security systems, radios, Compact Disc (CD) players, internal and external lighting systems, temperature control systems, locking systems, seat adjustment systems, speed control systems, mirror adjustment systems, directional indicators, etc. Generally the processors that control these different car systems do not talk to each other. For example, the car radio does not communicate with the car heating system or the car braking system. This means that each one of these car systems has to provide a separate standalone operating system. For example, separate processors and separate user interfaces are required for the car temperature control system and for the car audio system. Many of these different car processors may be underutilized since they are only used intermittently.

Even when some processors in the car do talk to each other, they are usually so tightly coupled together that it is impossible to change any one of these processors without disrupting all of the systems that are linked together. For example, some cars may have an interface on the dashboard that controls both internal car temperature and a car radio. The car radio cannot be replaced with a different model and still work with the dashboard interface and the car temperature controller.

Integration of new systems into a car is also limited. Car systems are designed and selected well before the car is ever built. A custom wiring harness is then designed to connect all the car systems selected for the car. A car owner can not later incorporate new systems into the existing car. For example, a car may not originally come with a car navigation system. An after market navigation system from another manufacturer cannot be integrated into the car.

Because after market devices can not be integrated into car control and interface systems, it is often difficult for the driver to try and operate these after market devices. For example, the car driver has to operate the after market navigation system from a completely new interface, such as the keyboard and screen of a laptop computer. The driver then has to operate the laptop computer, not from the front dashboard of the car, but from the passenger seat of the car. This makes many after market devices both difficult and dangerous to operate while driving.

The present invention addresses this and other problems associated with the prior art.

SUMMARY OF THE INVENTION

A communication system for a mobile vehicle, home, or office environment includes multiple processors. The multiple processors each run an Open Communication system that controls how data is transferred between processors based on data content as opposed to the links that connect the processors together. The open communication system enables data or messages to be effectively transferred and processed for real-time applications or other server based applications that may be running on the multiple processors in a secure environment regardless of processors, locations, or data links.

BRIEF DESCRIPTION OF THE DRAWINGS

FIG. 7 is a diagram showing one example of how the open communication system is used by different processors.

FIG. 8 is a diagram of a tracking report that is generated by the open communication system.

DETAILED DESCRIPTION

Figure 1:
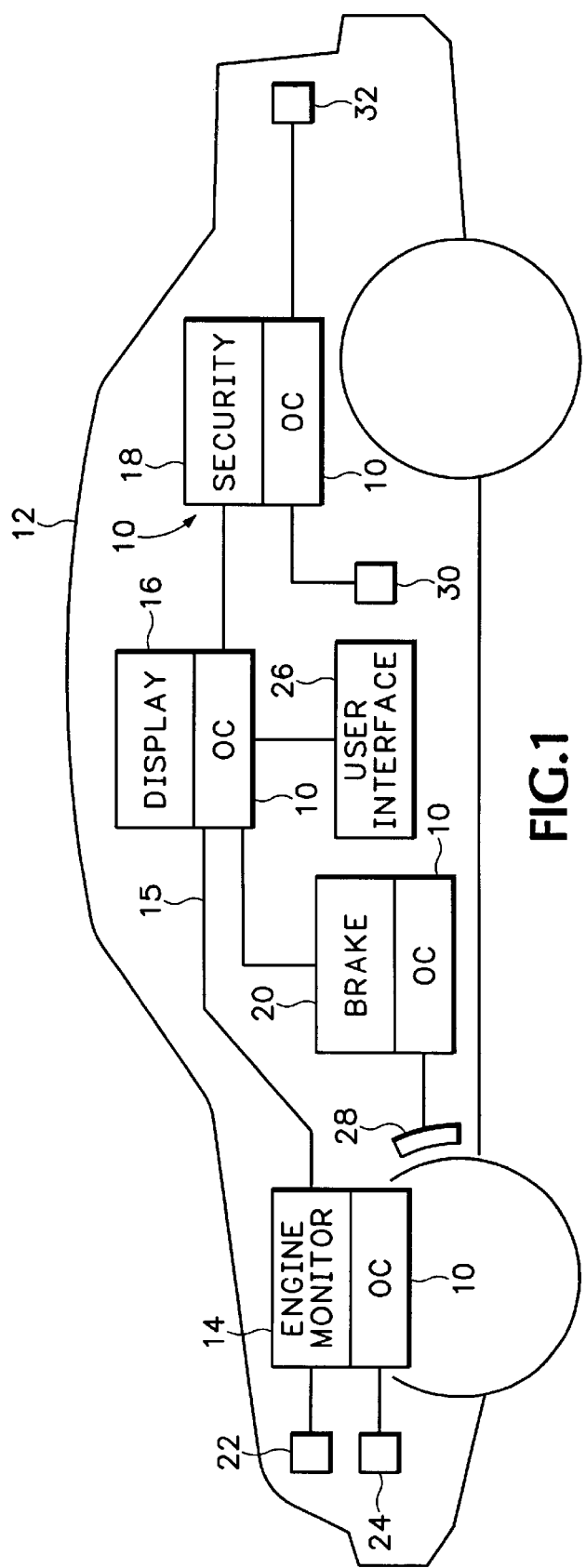
FIG. 1 is a diagram of a car that have multiple processors that each run an open communication system.

FIG. 1 shows a car 12 that includes multiple processors 14, 16, 18 and 20. The engine monitor processor 14 in one configuration monitors data from different sensors 22 and 24 in the car engine. The sensors 22 and 24 can be any sensing device such as sensors that monitor water temperature, oil temperature, fuel consumption, car speed, etc. The brake control processor 20 monitors and controls an Automatic Braking System (ABS) 28. The display processor 16 is used to control and monitor a graphical or mechanical user interface. The security processor 18 monitors and controls latches and sensors 30 and 32 that are used in a car security system.

Typical networks, such as in an office network environment, enable multiple computers to communicate with each other. Applications such as printing jobs can be launched from any one of the networked computers. If one of the networked computers crashes or is busy, a user must manually send the job to another computer. The other computer then handles the task like any other locally received task.

In a car environment, tasks must be processed with different priorities in real-time. For example, the braking tasks in the brake processor 20 have to be processed with a high priority while a radio selection task performed in the display processor 16 can be processed with a relatively low priority. The processors 14, 16, 18 and 20 all include software that runs an Open Communication (OC) system 10 that enables the multiple processors to transfer data and exchange messages for performing these real-time car applications.

If the processor 20 currently running the high priority braking application fails, the OC system 10 allows the braking tasks to be offloaded to another processor in car 12, such as the display processor 16. The OC system 10 automatically assigns a high priority to the braking tasks that allow the braking tasks to override lower priority tasks, such as the radio application, that are currently being performed in display processor 16.

The OC system 10 also ensures that data in each processor is processed in a secure manner for the car environment. The security portion of the OC system 10 prevents unauthorized devices from accessing the different car applications. The OC system 10 also includes a logging portion that allows data in the car system to be automatically logged. This is important for accident reconstruction purposes. The OC system 10 also allows different processors to communicate over different communication protocols and hardware interfaces. Any processor that includes an OC system 10 can be integrated in the system shown in FIG. 1. This allows different processors and different applications can be seamlessly replaced and added to the overall multiprocessor system.

The description below gives only a few examples of the different processors and different applications that can implemented using the OC system 10. However, any single or multiprocessor system located either inside or outside of car 12 can communicate and exchange data using the OC system 10. It should also be understood that the OC system 10 can be used in any real-time network environment such as between processors used in appliances and computers in the home.

Figure 2:
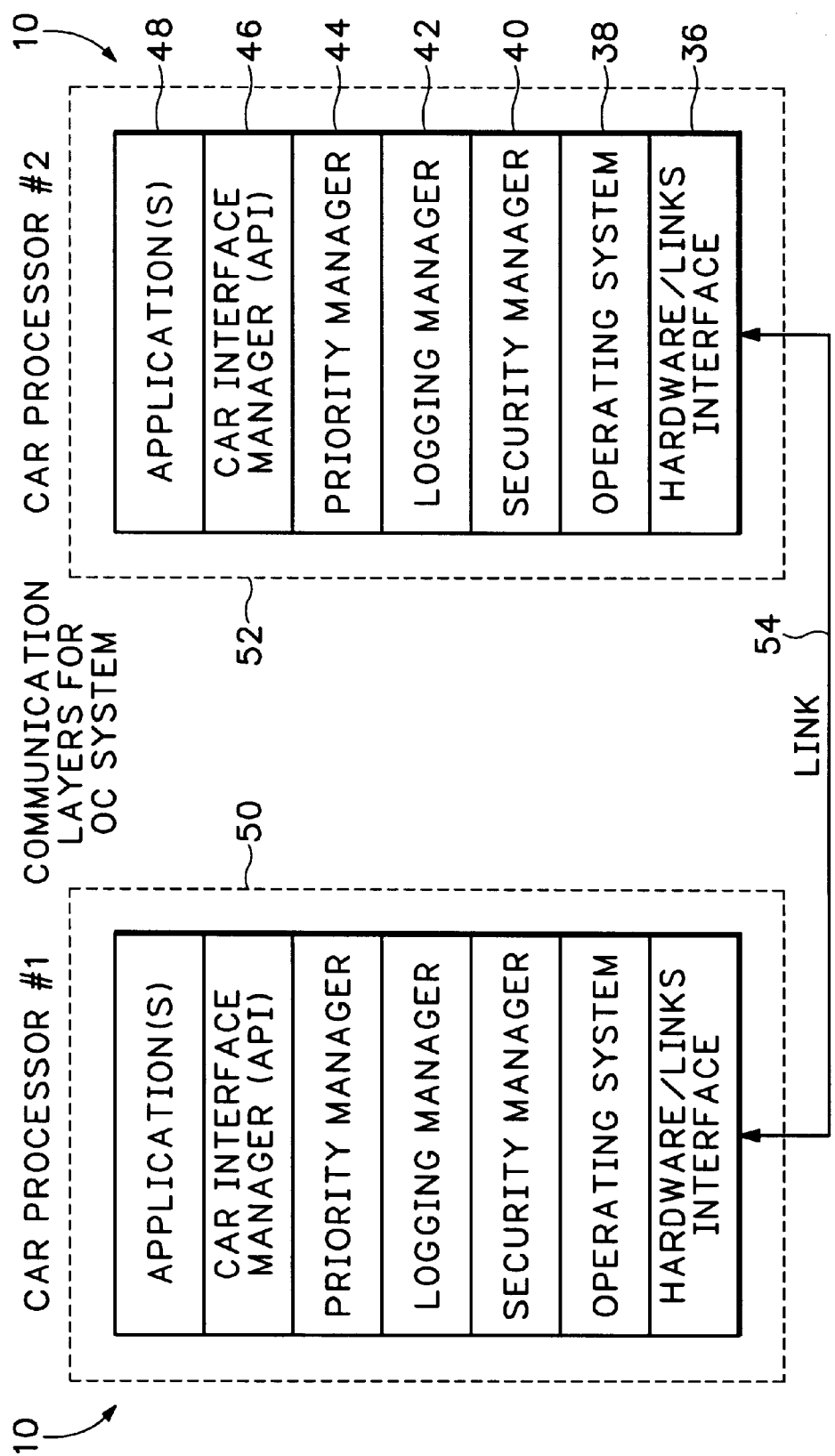
FIG. 2 is a block diagram of the open communication system shown in FIG. 1.

FIG. 2 is a block diagram of the communication managers used in the OC system 10 described in FIG. 1. The different communication managers in the OC system 10 are configured to provide the necessary control for operating a distributed processor system in a real-time car environment. Applications 48 are any of the different applications that can be performed for the car 12 shown in FIG. 1. For example, applications can include car displays, braking control, security systems, sensor monitoring, airbag deployment, etc. One or more applications can be run in the same processor at the same or at different times.

A car interface manager 46 operates as an Application Programmers Interface (API) that can be implemented in any variety of different languages such as Java, C++, Extensible Markup Language (XML) or HyperText Markup Language (HTML), etc. The car interface manager 46 enables applications 48 to be written in any variety of different languages. This prevents the applications 48 from having to be written specifically for the car environment or for a specific communication protocol. Thus, applications written for other systems can be reused in the car system described below. The car interface manager 46 reads basic processing and data transfer commands needed to transfer data and messages between different processors and storage mediums inside or outside the car 12.

Figure 3:
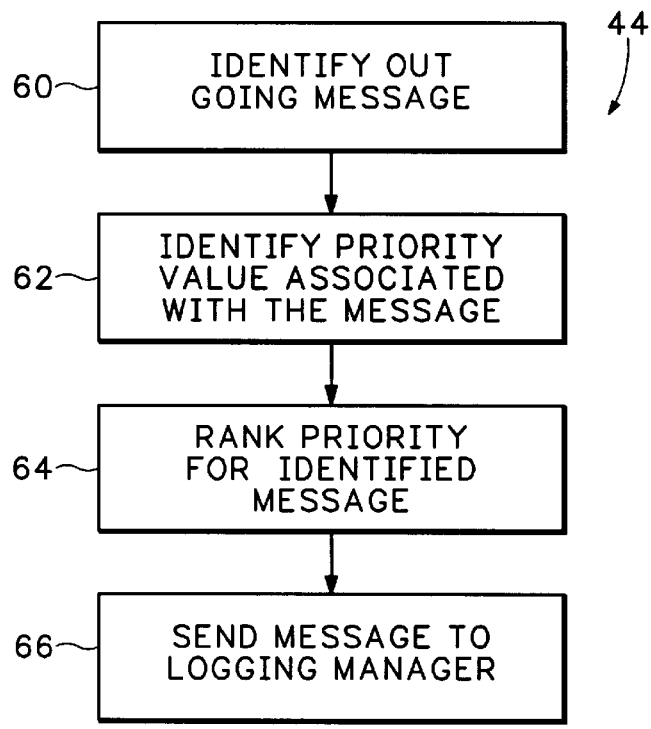
FIG. 3 is a flow diagram showing how a priority manager processes outgoing data in the open communication system.

For clarity the terms 'message' and 'data' are used interchangeably below. After a message passes through the car interface manager 46, a priority manager 44 determines a priority value for the message that determines how the message is processed both in the local processor 50 and in other processors such as processor 52. Referring to FIG. 3, an outgoing message is identified by the priority manager 44 in block 60. A priority for the message is identified in block 62 by reading a priority value that the generic car interface manager 46 has attached to the message.

In block 64, the priority manager 44 compares the priority value for the outgoing message with the priority values for other messages in the processor. The priority manager 44 ranks the outgoing message with respect to the other messages and then sends the message to the logging manager 42 in block 66 (FIG. 2). For example, there may be several messages that either need to be output or received by a particular processor. An output message with a high priority value, such as a crash indication message, will be assigned higher priority than other messages and will therefore be immediately transmitted by the processor 50 before other lower priority messages.

Figure 4:
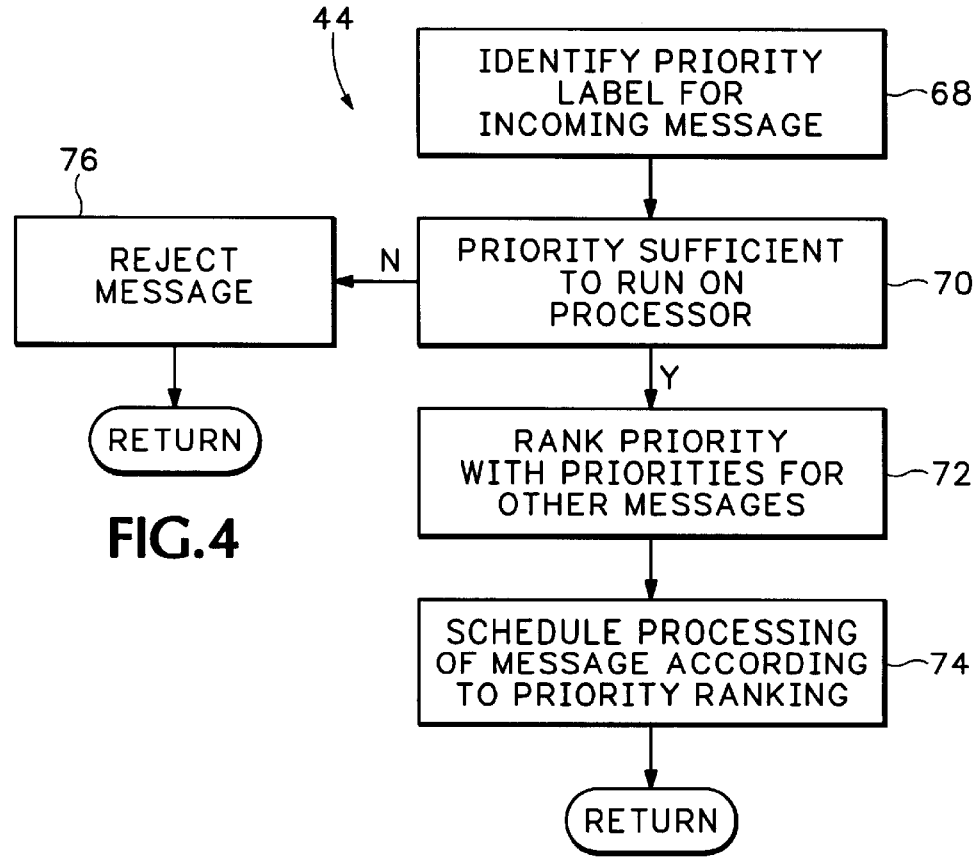
FIG. 4 is a flow diagram showing how the priority manager receives data in the open communication system.

FIG. 4 shows how the priority manager 44 receives messages from other processors. There may be multiple applications running on the same processor and multiple messages and data sent from other processors to those applications. For example, multiple sensors may be sending different types of data to a video display application running on one of the processor 50 (FIG. 2). That same processor 50 may also be receiving different types of sensor data for running an airbag deployment application. The priority manager 44 determines the order that messages are processed by the different applications that reside on processor 50.

In block 68, the priority manager 44 reads the priority labels for incoming messages. If the priority of the message is not high enough to run on the processor in block 70, the data or message is rejected in block 76. The priority manager 44 may send out a message to the sending processor indicating the message has been rejected. In some situations, the message or data may have such a low priority that an acknowledge message does not have to be sent back to the sending processor. For example, inside temperature data from a temperature sensor may be sent to one or more processors with no requirement that the processor accept or acknowledge the data. In this case the temperature data is sent with a very low priority value that indicates to the priority manager 44 that no message needs to be sent back to the temperature sensor even if the data is rejected.

The priority manager 44 in block 72 ranks the priority of the incoming message in relation to the priorities of all the other messages in the processor. The priority manager in block 74 decides according to the ranking whether the message should be put in a queue or sent directly to the application for immediate processing. For example, a crash indication message may have a high enough priority to cause the priority manager 44 to delay all data currently being processed by all other applications in the same processor. The priority manager 44 directs all the applications to wait while the current high priority crash indication message is processed. The other data and messages are queued in the processor and processed after the crash indication message has been completed.

Figure 5:
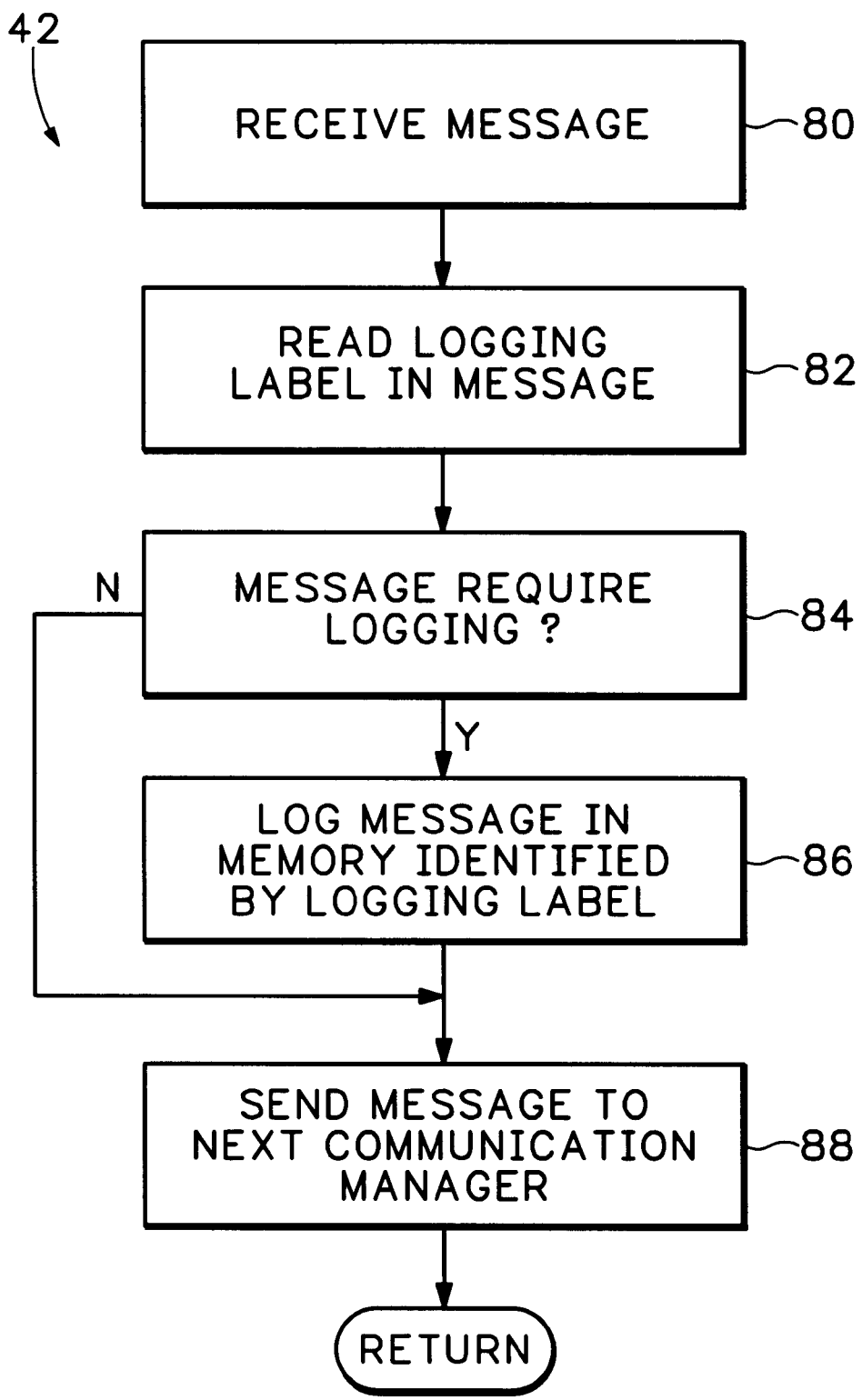
FIG. 5 is a flow diagram showing how a logging manager processes data in the open communication system.

Referring to FIGS. 2 and 5, a logging manager 42 controls what data is logged by different processors. It may be important to log critical failures that occur during an accident. For example, it may be important to verify that a particular processor sent an air bag deployment message and that another processor successfully received the airbag deployment message. This would allow insurance companies and other entities to reconstruct accidents by identifying when and where different messages were sent and received.

The logging manager 42 receives either an incoming message over a communications link for sending to a local application 48 or receives an outgoing message from one of the local applications 48 for sending out over the communications link to another processor in block 80. The logging manager 42 reads a logging label in the message in block 82. If the logging label indicates that no logging is required, the message is sent on to the next communication manager in block 88. If it is an outgoing message it is sent to the security manager 40 (FIG. 2). If it is a incoming message it is sent to the priority manager 44. If the message requires logging, the logging manager 42 stores the message in a memory in block 86. The logging label may indicate a particular type of memory for logging, such as a nonvolatile Flash memory or, if available, a high volume hard disk peripheral memory.

The logging manager 42 in each processor, provides the OC system 10 with the unique ability to track when and where messages are sent and received at different processors in the multiprocessor car system. This is important in accident reconstruction allowing the logging managers 42 to identify which processors and applications failed and also the sequence in which the different processors and associated applications failed.

The logging manager 42 can also track unauthorized messages and data that may have caused any of the processors in the car to crash. For example, an audio processor that handles audio applications in the car may crash due to unauthorized downloading of MP3 music from a laptop computer. The logging manager 42 can log the unauthorized data received from the laptop MP3 player. The logging manager 42 logs any data that does not have a particular security or priority label value. A system administrator can then down load the MP3 data to identify what caused the audio processor to crash.

Figure 6:
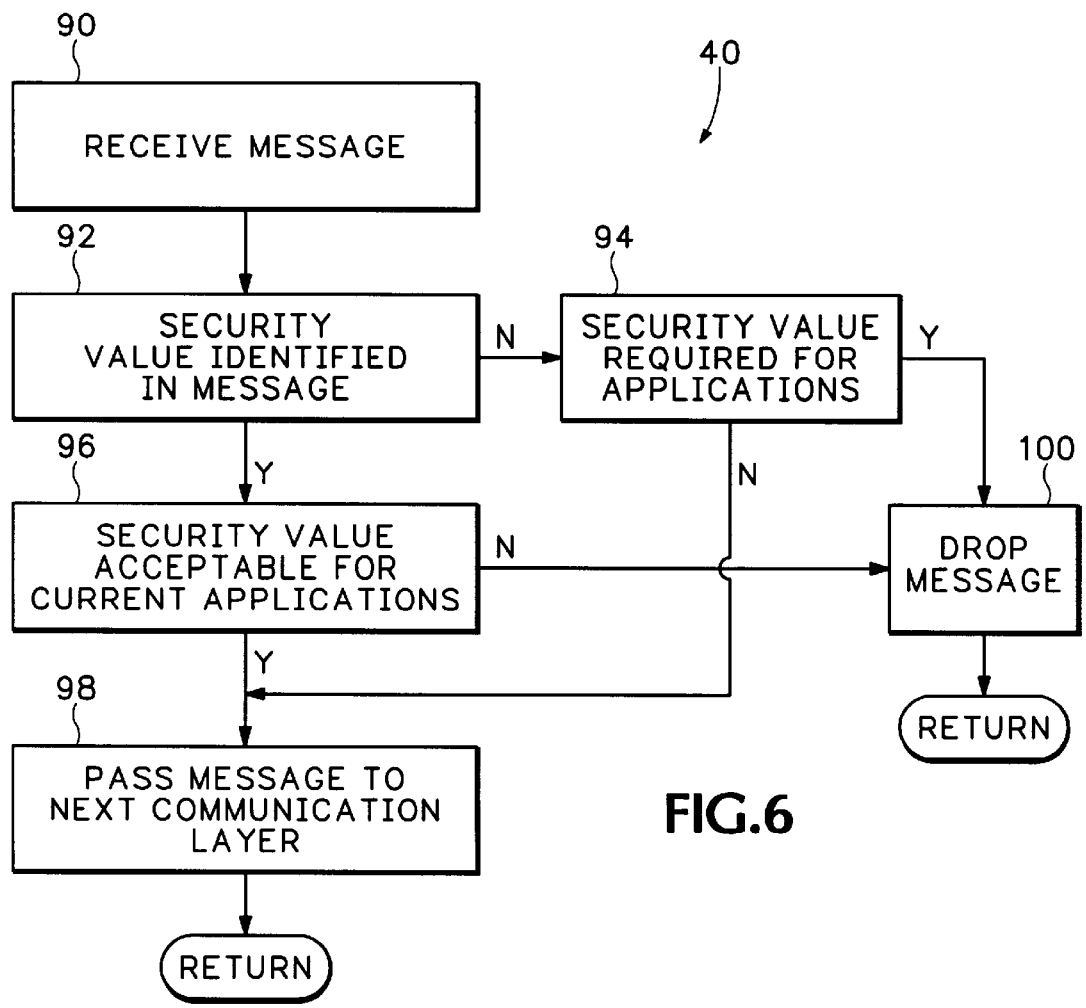
FIG. 6 is a flow diagram showing how a security manager processes data in the open communication system.

Referring to FIGS. 2 and 6, a security manager 40 provides security for applications both receiving and transmitting messages. For instance, a laptop computer may be connected to a Ethernet port in the car 12 (FIG. 1). If the laptop computer does not use the OC system 10, data from that laptop application is not allowed to access certain processors or certain applications in the car 12. For example, audio data should not be sent or processed by a processor that performs car braking control.

The security manager 40 in block 90 reads a message either received from an application on the same processor or received over a communication link from another processor. The security manager 40 determines if there is a security value associated with the message in block 92. If there is no security value associated with the data, the security manager 40 may drop the data in block 100. However, some applications, such as a processor that plays audio data may not require a security label. In this case, the security manager in block 94 allows the data to be passed on to the application in block 98.

In other instances the data or message may have a security value, but that security value is not sufficient to allow processing on the present applications. For example, data for car security monitoring may be sent to a processor that controls air bag deployment and an automatic braking system. The two currently running applications may set a minimum security level for receiving data. If data received from other processors do not have that minimum security level in block 96, the data is dropped in block 100. Otherwise, the data or message is passed on to the next communication layer for further processing in block 98. Thus the security manager 40 prevents unauthorized data or messages from effecting critical car applications.

Referring back to FIG. 2, an operating system layer 38 identifies the communication platform used for communicating the data or message over a link identified in a hardware/link interface 36. The operating system 38 then formats the message for the particular communication stack and medium used by the identified link 54. For example, the operating system layer 38 may identify a first message being transmitted over a Bluetooth wireless link and a second message transmitted over a Transmission Control Protocol/Internet Protocol (TCP/IP) packet switched link. The data or message adds whatever headers and formatting is necessary for transmitting the first message over the Bluetooth wireless link and the second message over the TCP/IP hardwired link.

The hardware/link interface 36 includes the software and hardware necessary for interfacing with different communication links 54. For example, the two processors 50 and 52 may communicate over a Ethernet link, 802.11 wireless link, or hardwired Universal Serial Bus link, etc. The software necessary for the two processors to communicate over these different interfaces is known to those skilled in the art and is therefore not described in further detail.

FIG. 7 describes one example of an application that uses the OC system 10 described above in FIGS. 1–6. A car 102 includes an radar sensor 104 that is controlled by a radar processor 106. The radar sensor 104 is located in the front grill of car 102. An InfraRed (IR) sensor 110 is controlled by an IR processor 112 and is located on the front dash of car 102. A braking system 123 is controlled by a brake control processor 122. The IR processor 112 is connected to a fusion processor 114 by an Ethernet link 116 and the radar processor 106 is connected to the fusion processor 114 by a 802.11 wireless link 108. The brake processor 122 is connected to the fusion processor 114 by a CAN serial link 120. The fusion processor 114 is also coupled to a display screen 118.

The radar sensor 104 in combination with the radar processor 106 generates Radar Track Reports (RTRs) 130 that are sent to the fusion processor 114. The IR sensor 110 in combination with the IR processor 112 generate Infrared Track Reports (ITRs) 128 that are sent to the fusion processor 114.

Referring to FIG. 8, each track report 128 and 130 includes communication link headers 132 for communicating over an associated interface medium. In this example, the radar track report 130 includes the link headers 132 necessary for transmitting data over the 802.11 link 108. The infrared track report 128 includes the link headers 132 for transmitting data over the Ethernet link 116.

The track reports 128 and 130 include Open Communication (OC) labels 133 for performing the OC operations described above. A security label 134 is used by the security manager for preventing unauthorized data from being downloaded into one of the car processors and disrupting applications. A logging label 136 is used by the logging manager to identify data that needs to be logged in a local memory. The priority label 138 is used by the priority manager for scheduling messages or data to the applications run by the processors. The link headers 132, security label 134, logging label 136 and priority label 138 are all part of the data 131 used by the open operating system 131.

The radar processor 106 and IR processor 112 also send a time of measurement 140 and other data 142 from the radar sensor 104 and IR sensor 110, respectively. The data 142 can include kinematic states of objects detected by the sensors. The time of measurement data 140 and other sensor data 142 is referred to as application data 139 and is the actual data that is used by the application.

Figure 9:
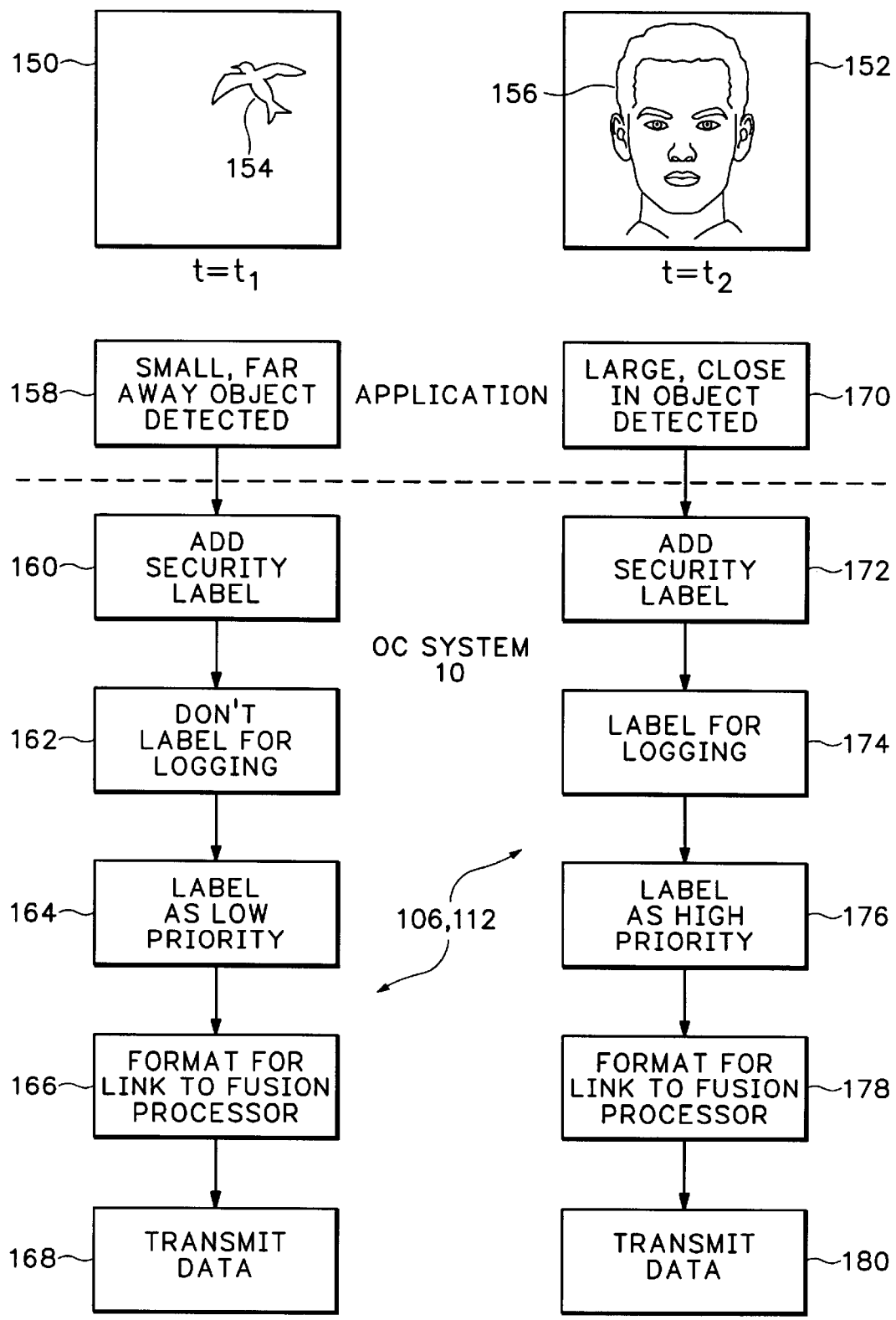
FIG. 9 is a flow diagram showing how different image data is processed and transmitted using the open communication system.
Figure 10:
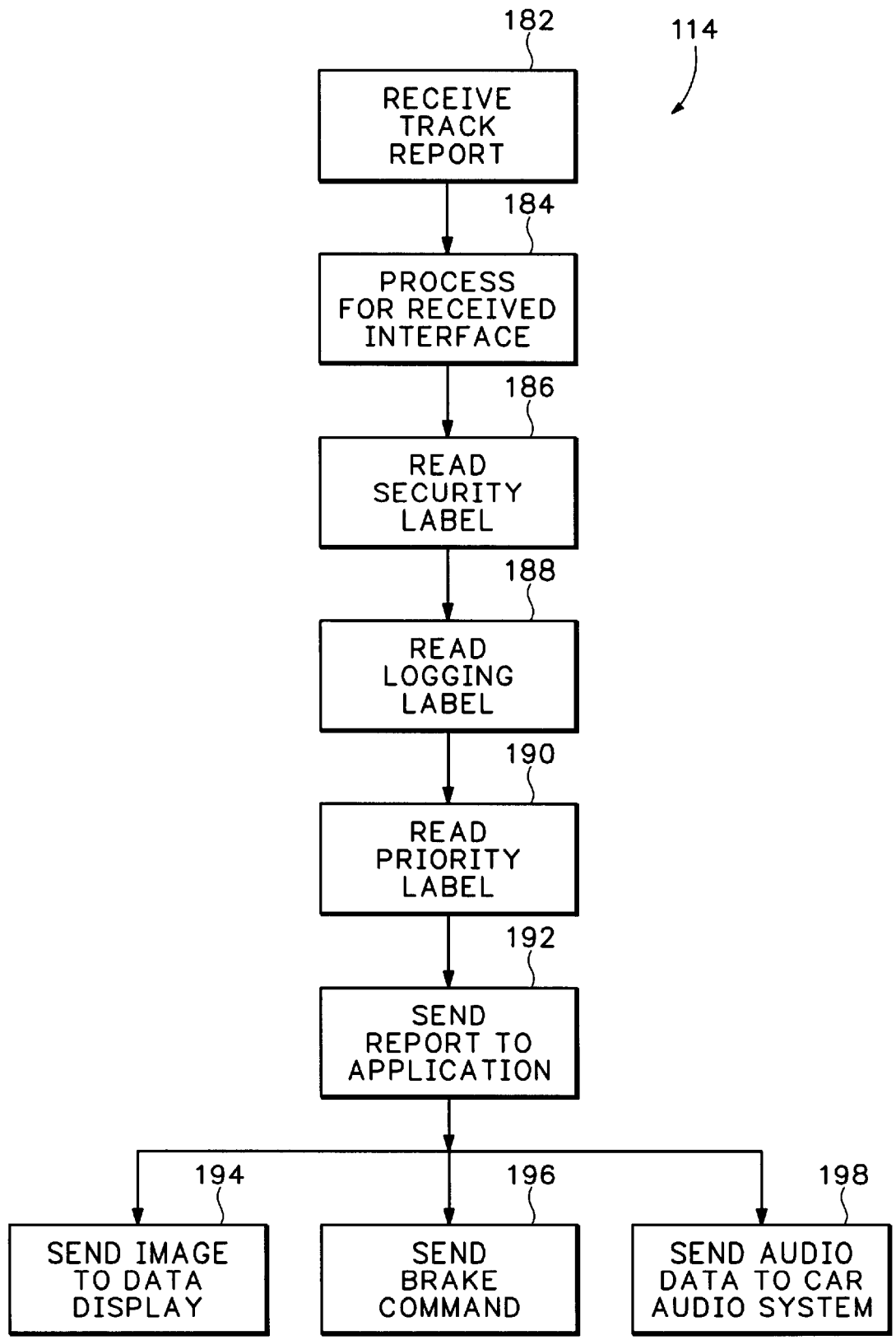
FIG. 10 is a flow diagram showing how the transmitted image data in FIG. 9 is received and processed using the open communication system.

FIGS. 9 and 10 show one example of how the radar and infrared sensor data is processed by the OC system 10. One or both of the radar processor 106 and the IR processor 112 may generate image data 150 and 152 for the area in front of the car 102 (FIG. 7). For simplicity, the discussion below only refers to an image generated by radar sensor 104. At a first time $t=t_1$, sensor 104 detects a small far away object 154. At another time $t=t_2$, sensor 104 detects a large up-close object 156.

The applications described below are all performed by the OC system 10 thus preventing the applications from having to handle the tasks. This allows the applications to be written in a completely portable fashion with no knowledge of the network hardware, security, priority and logging operations. This greatly reduces the cost of creating applications.

An image processing application in the processor 106 identifies the object 154 as a small far away object in block 158. The image and kinematic data for the object is output by the OC system 10 as a radar track report 130. The security manager 40 (FIG. 2) in the radar processor 106 adds a security label 134 to the report in block 160 and the logging manager 42 may or may not add a logging label to the report in block 162. In this example, the object 154 has been identified by the image processing application as a small far away object. Therefore, the logging manager does not label the track report for logging. The priority manager 44 (FIG. 2) adds a priority label 138 (FIG. 8) to the report in block 164. Because the image processing application identifies the object 154 as no critical threat (small far away object), the priority label 138 is assigned a low priority value in block 164.

The OC system 10 then formats the radar track report in block 168 according to the particular link used to send the report 130 to the fusion processor 114. For example, the operating system 38 and the hardware/link interface 36 (FIG. 2) in the radar processor 106 attaches link headers 132 to the track report 130 (FIG. 8) for transmitting the report 130 over the 802.11 link. The track report 130 is then sent out over the link 108 in block 168 to the fusion processor 114.

Referring next to FIGS. 7–10, the fusion processor 114 includes a wireless interface 119 that communicates with the wireless 802.11 link 108 and an Ethernet interface 117 that communicates with the Ethernet link 116. The hardware/link interface 36 in the fusion processor OC system 10 uses the link headers 132 (FIG. 8) to receive the radar track report 130 in block 182 and process the reports in block 184 (FIG. 10).

The OC system 10 reads the security label in block 186 to determine if the track report has authority to be processed by the fusion processor 114. If the track report passes the security check performed by the security manager in block 186, the logging manager in block 188 checks to see if either the received radar data needs to be logged. In this example, the image processing application in the radar processor identified the object 154 (FIG. 9) to be within a particular size range and distance range that does not indicate a critical crash situation. Therefore, the track report 130 was not labeled for logging. The fusion processor 114 therefore does not log the received report in block 188.

Because the image 150 was identified as non-critical, the priority label 138 (FIG. 8) for the track report 130 is given a low priority value. The fusion processor 114 ranks the track report with the other data that is being processed and then processes the report according to the ranking.

Different applications in the fusion processor 114 may or may not be performed depending on the track report. For example, the object 154 may be sent to a video display in block 194. However, the fusion processor 114 will not send a brake command in block 196 to the car braking system 123. This is because the image has been identified as non-critical. Similarly, no audio warning is sent to the car audio system in block 198 because the object has been identified as non-critical.

Referring back to FIG. 9, in another example, the IR processor 112, the radar processor 106, or both, in block 170 detect at time $t_2$ an object 156 that is large and close to the car 102. For simplicity, it is assumed that only the IR processor 112 has identified object 156. The IR processor 112 generates a track report 128 in block 170 and the OC system in the IR processor 112 adds a security label 134 (FIG. 8) to the report in block 172. Because the object 156 has been identified as being within a predetermined size and within a predetermined range of car 102 (critical data), the logging manager in the IR processor 112 assigns a logging label value 136 to the IRT 128 that directs all processors to log the image data 142. The image data is logged by the IR processor 112 in a local memory in block 174.

Because the IR track report 128 has been identified as critical data, the priority manager 44 in the IR processor 112 assigns a high priority label value 138. This high priority value is read by the operating system 38 and interface hardware 36 (FIG. 2) in blocks 178 and 180. Accordingly the IR track report 128 is given preference when being formatted in block 178 and transmitted in block 180 over Ethernet link 116 to the fusion processor 114.

Referring again to FIG. 10, the IR track report 128 is received by the fusion processor 114 in block 182 and the link processing performed in block 184. This link processing is known to those skilled in the art and is therefore not described in further detail The report may be given higher link processing priority in the fusion processor 114 based on a priority value assigned in the link headers 132.

The security manager 40 in the fusion processor 114 confirms there is an acceptable value in the security label in block 186 and then passes the IR track report 128 to the logging manager in block 188. The logging manager 42 in the fusion processor 114 reads the logging label and accordingly logs the image data in a local nonvolatile memory. This provides a history of the image 156 that was detected by the IR sensor 110.

The logged image data may then be used in subsequent accident analysis. For example, an accident reconstruction specialist can download the logged image data or message in both the IR processor 112 and in the fusion processor 114 to determine when the image data 140 and 142 was first detected. It can then be determined whether the image data was sent by the IR processor 112 and received by the fusion processor 114.

The priority manager reads the priority label 138 in block 190 and determines that the IR track report has a high priority. Accordingly, the track report is immediately sent to different applications in block 192. The priority manager 44 may first send the track report to the brake control application in block 196. The brake control application immediately sends a brake command 125 (FIG. 7) to the brake processor 122.

The logging manager 42 in the fusion processor 114 adds a logging label 136 to the outgoing brake command 125. Both the fusion processor 114 and the brake control processor 122 will then both log the brake command 125. Thus, not only is the sequence of transmissions of the image data and messages logged in both the IR processor 112 and fusion processor 114 but also the sequence of the brake message 125 from the fusion processor 114 to the brake processor 122. This further adds to any accident analysis data that may need to be obtained from the car if an accident occurs.

The IR data may also be sent to an audio application in block 198 that immediately sends out an audio alarm over the car stereo system or out over a car horn. This automatically warns both the car driver and the object 156 in front of car 102 of a possible collision. In a third application, the fusion processor 114 may send the IR image data to an image display 118 in block 194.

Figure 11:
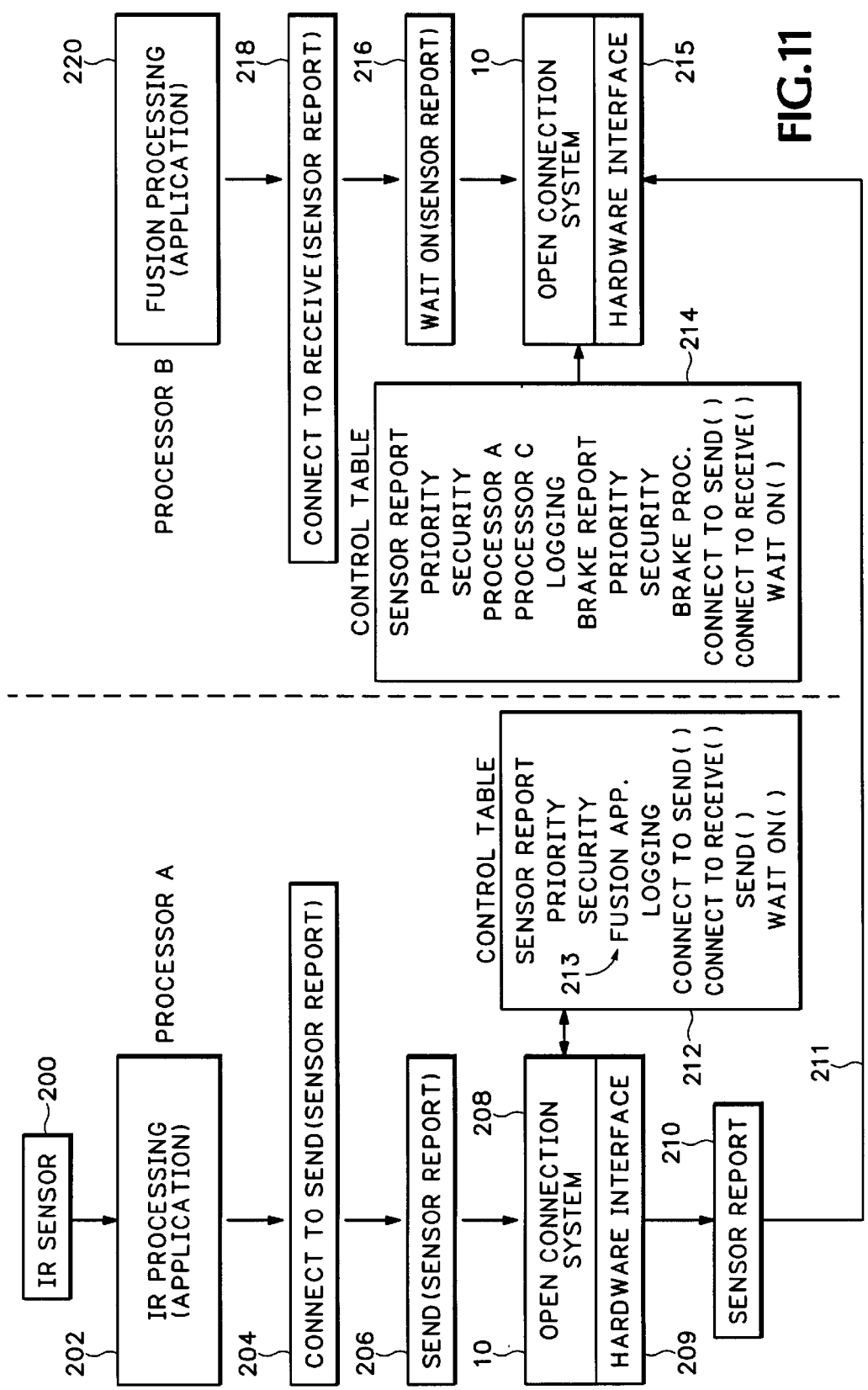
FIG. 11 is a block diagram showing another example of how the open connection system operates.

FIG. 11 is a block diagram showing another example of how the OC 10 exchanges information according to the type of data independently of the physical links that connect the different applications together. A processor A runs an application 202. In this example, the application 202 is an IR processing application that receives IR data from an IR sensor 200 and outputs the IR data as a sensor report. A processor B runs a fusion processing application 220 that controls other car functions in part based on the IR sensor report.

The OC system 208 includes a control table 212 that includes several parameters associated with a SENSOR REPORT 210. For example, the SENSOR REPORT 210 may need to include a priority label, a security label or a logging label. The security label also includes one or more locations where the SENSOR REPORT 210 should be sent. The IR application 202 includes a CONNECT TO SEND (SENSOR REPORT) command that the OC 10 then uses to establish a slot in memory for the SENSOR REPORT. When IR data is received from the IR sensor 200, the IR application 202 generates sensor data (FIG. 8) for the SENSOR REPORT 210 and stores that sensor data in the memory slot established by the OC system 10. The sensor data is contained within the application data section 139 of the sensor report shown in FIG. 8. The IR application 202 then issues the SEND(SENSOR REPORT) command 206 to notify the OC 10 that there is a SENSOR REPORT in the reserved slot in memory.

The OC system 10 attaches a security label 134, logging label 136 and priority label 138 to the SENSOR REPORT 210 as described previously in FIG. 8. The OC system 10 then adds the necessary link headers 132 (FIG. 8) that are required to send the SENSOR REPORT 210 to other identified applications. The control table 212 includes security parameters associated with the SENSOR REPORT data type. One of the SENSOR REPORT security parameters, in addition to a security value, is an identifier 213 for the fusion application 220 running in processor B. The identifier 213 identifies whatever address, format, and other protocol information is necessary for transmitting the SENSOR REPORT 210 to the fusion application 220. The OC system 10 attaches the link headers 132 to the SENSOR REPORT 210 and then sends the report through a hardware interface 209 over a link 211 to processor B.

The fusion application 220 works in a similar manner and initiates a CONNECT TO RECEIVE (SENSOR REPORT) command to the OC system 10 running in the same processor B. The OC system 10 reserves a slot in local memory for any received SENSOR REPORTs 210. The fusion application 220 issues a WAIT ON (SENSOR REPORT) command that continuously waits for any SENSOR REPORTs 210 sent by the IR application 202. The OC system 10 control table 214 also identifies from the SENSOR REPORT data type the communication link 211, hardware interface 215 and other associated communication protocols used for receiving the SENSOR REPORT 210.

Whenever a SENSOR REPORT 210 is received, the OC system 10 in processor B performs the security, logging and priority management operations described above based on the labels 134, 136 and 138 in the sensor report 210 (FIG. 8). The OC system 10 then places the sensor data from the SENSOR REPORT 210 in the memory slot reserved in local memory. The OC system 10 detects the data in the reserved memory slot and processes the sensor data. Another portion of the fusion application 220 may send out a BRAKE command based on the sensor data. The control table 214 for the OC system 10 in processor B also includes the necessary system parameters for sending a BRAKE REPORT to another processor in the multiprocessor system, such as a brake processor.

The communication link between the fusion application 220 and the brake application may be completely different than the link between the IR application 202 and the fusion application 220. However, the fusion application 220 outputs the SENSOR REPORT and the BRAKE REPORT in the same manner. The OC system 10 then uses stored link information in the control table 214 to communicate to the IR application 202 and the brake application over different links.

Thus, the IR application 202 and the fusion application 220 do not need to know anything about the physical links, address, or any of the other operations that are used to transmit data over different communication links.

The system described above can use dedicated processor systems, micro controllers, programmable logic devices, or microprocessors that perform some or all of the communication operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

What is claimed is:

1. A method for communicating between different software applications in a same mobile vehicle, comprising:

associating individual communication managers with individual software applications in the mobile vehicle;

receiving messages at the different individual software applications in the mobile vehicle and generating messages from the different individual software applications in the mobile vehicle;

passing the received messages through the individual communication managers associated with different individual software applications receiving the messages before processing the messages with the different software applications receiving the messages in the mobile vehicle and passing the generated messages through the individual communication managers associated with the different individual software applications before sending the generated messages to other software applications in the mobile vehicle, the communication managers each independently attaching message labels to individual messages that individually identify different priority values for the individual messages; and performing different real-time mobile vehicle applications in the mobile vehicle according to the message labels.

2. A method according to claim 1 wherein the communication managers individually associated with the individual software applications include a security manager that prevents messages without individually assigned security labels from being processed by certain software applications or certain processors in the mobile vehicle.

3. A method according to claim 1 wherein the communication managers include logging managers individually associated with individual software applications, the logging managers each independently attaching logging labels to individual messages generated by the associated individual software applications.

4. A method according to claim 3 wherein the logging managers independently log individual messages according to the logging labels attached to the individual messages.

5. A method according to claim 1 wherein the communication managers include a priority manager that submits the messages to the different applications according to an identified priority label included with the messages.

6. A method according to claim 5 wherein the priority manager assigns different priority values to individual sensor data messages received from a sensor application according to a degree of possible vehicle collision associated with the individual sensor data messages.

7. A method according to claim 6 wherein messages indicating a possible vehicle collision are assigned a high priority value by one of the communication managers in the vehicle that causes other communication managers in the vehicle to process the critical collision message before other mobile vehicle messages.

8. A method according to claim 1 including receiving the messages from different processors in the mobile vehicle over different communication links.

9. A method according to claim 1 wherein the different communication links include a wireless communication link and a serial communication link.

10. A method according to claim 1 including:
receiving image sensor data from an image processor;
processing the sensor data in one of the applications when a security label is identified in the sensor data;
logging the image sensor data when a logging label is identified in the image sensor data; and
prioritizing the processing of the image sensor data by one of the applications according to a priority label in the image sensor data.

11. A method according to claim 10 including:
sending a break message to a break control processor when an object in the image data is identified as being within a predetermined range of the mobile vehicle;
attaching a logging label to the break command; and
assigning a high priority value to a priority label in the break command.

12. A method according to claim 10 including sending an annunciation message to speakers in the mobile vehicle when an object in the image data is identified as being within a predetermined range of the mobile vehicle.

13. A system for a vehicle, comprising:
multiple processors in the vehicle operating multiple individual software applications;
multiple links connecting the multiple processors together; and
the multiple processors in the vehicle each operating a communication system that includes individual priority managers associated with the individual software applications, the individual priority managers attaching priority labels to individual messages transferred between individual software applications in the vehicle, the priority labels used independently by the individual priority managers to determine processing priorities for the individual messages for the individual software applications.

14. A system according to claim 13 including individual communication managers each associated one of the individual software applications operating in the vehicle.

15. A system according to claim 13 including security managers associated with the individual software applications, the security managers each individually preventing data or messages from unauthorized applications in the vehicle from sending data to their associated individual software applications.

16. A system according to claim 13 including individual logging managers each associated with individual software applications, the individual logging managers each controlling when data and messages from the different applications are individually logged by their associated software applications.

17. A system according to claim 13 wherein the priority managers assign priority values to different sensor data messages according to a likelihood of objects identified in the sensor data colliding with the vehicle.

18. A system according to claim 13 wherein the applications include a sensor application, a fusion application; and a break control application.

19. A system according to claim 18 wherein the fusion application receives image data from the sensor application and sends breaking commands to the break control application according to the image data.

20. A system according to claim 19 wherein the fusion application and the sensor application log the image data or messages according to how close objects in the image data are from the vehicle.

21. A system according to claim 20 including a second sensor application that sends image data to the fusion application.

22. A system according to claim 13 including a display application that displays sensor data from a sensor application according to a security label, logging label and priority label attached to the sensor data by the communication system.

23. A system according to claim 13 wherein some of the multiple links use different communication protocols for transferring messages and data between the different processors.

24. A system according to claim 23 wherein one of the links is a wireless link and another one of the links is a hardwired serial link.

25. A communication system, comprising:
a processor adapted to run different individual applications;
multiple interfaces adapted to transfer individual messages and data between the different applications over different communication links; and
the processor further adapted to run independently operating communication managers associated with the different individual applications, the communication managers attaching communication labels to the individual messages and data transferred between the different applications, the communication labels uniquely identifying priority values for the individual messages for controlling how the individual messages and data are processed in real-time by the different applications.

26. A communication system according to claim 25 wherein the communication labels are separate from network headers used to transfer the messages and data over the different communication links.

27. A communication system according to claim 26 wherein the communication manager includes a security manager, a logging manager and a priority manager.

28. A communication system according to claim 27 wherein the processor is part of a multiprocessor network used in an automobile.

29. A communication system according to claim 27 wherein the processor is part of a multiprocessor system used in a home or office.

30. A communication system according to claim 27 wherein the processor performs any one of the following applications:

image sensing in a car;
   display control in a car;
   breaking control in a car;
   audio control in a car;
   video control in a car;
   engine monitoring in a car;
   airbag deployment in a car;
   temperature control in a car; or
   security monitoring in a car.

* * * * *